United States Patent [19]

Hill et al.

[11] Patent Number: 4,779,369
[45] Date of Patent: Oct. 25, 1988

[54] DISPLAY APPARATUS

[75] Inventors: Roger W. Hill; Martin L. Hill, both of Bristol, England

[73] Assignee: Universal Components Limited, England

[21] Appl. No.: 865,952

[22] Filed: May 19, 1986

Related U.S. Application Data

[63] Continuation of Ser. No. 691,961, Jan. 16, 1985, abandoned.

[30] Foreign Application Priority Data

Jan. 16, 1984 [GB] United Kingdom ............... 8401057

[51] Int. Cl.4 .................................................. G09F 7/02
[52] U.S. Cl. .................................... 40/611; 40/491; 40/490; 40/642; 248/221.4
[58] Field of Search ............... 40/10 R, 486, 487, 488, 40/489, 490, 611, 616; 248/221.4

[56] References Cited

U.S. PATENT DOCUMENTS 3,400,477 9/1968 Brown ........................... 40/10 R
3,606,507 9/1971 Williams, Jr. ................ 40/10 R
4,310,135 1/1982 Dobson ....................... 248/221.4
4,344,244 8/1982 Tyke ............................... 40/611

FOREIGN PATENT DOCUMENTS 0098124 11/1984 European Pat. Off. .
1204677 9/1970 United Kingdom .
2084779 4/1982 United Kingdom .

Primary Examiner—Gene Mancene
Assistant Examiner—James R. Hakomaki
Attorney, Agent, or Firm—Larson and Taylor

[57] ABSTRACT

Display apparatus for mounting display members. Each member defines a channel open at at least one end, and preferably open at both ends and having a narrowed mouth in a front face. A support has projections engageable in the end of a channel. Preferably it is elongate, of L-section, with multiple projections on one arm of the L, such that display members of different sizes can engage different numbers. Preferably either arm of the L is mountable to a surface, so that the display members can be either parallel or perpendicular to it.

11 Claims, 2 Drawing Sheets

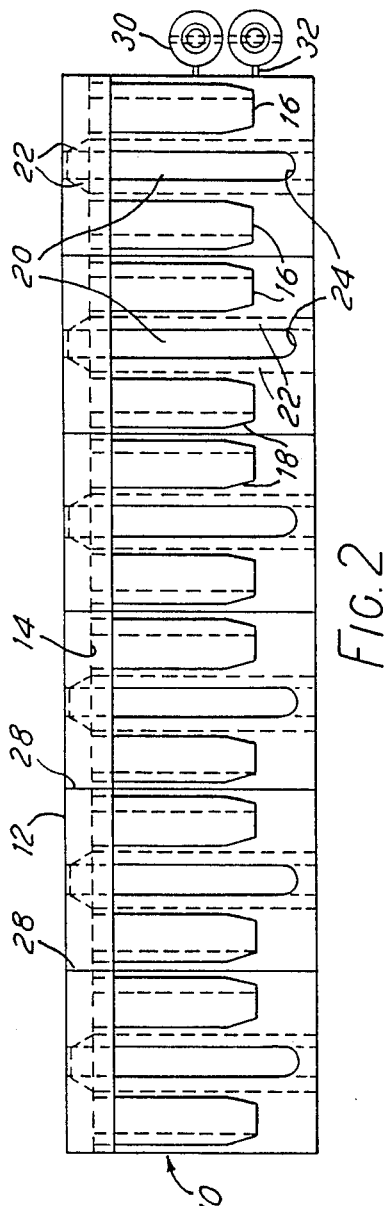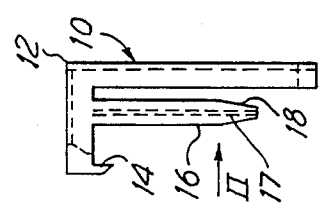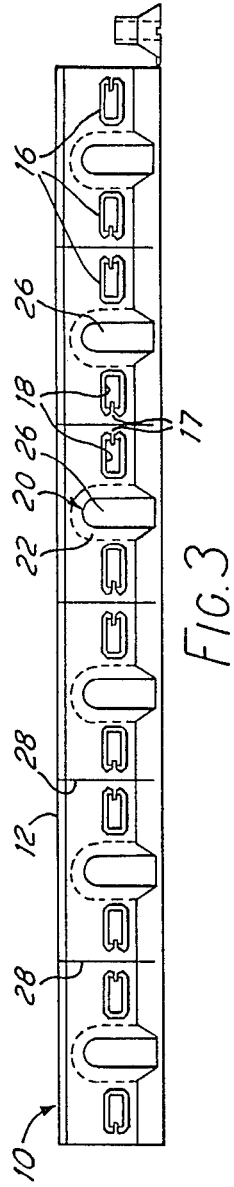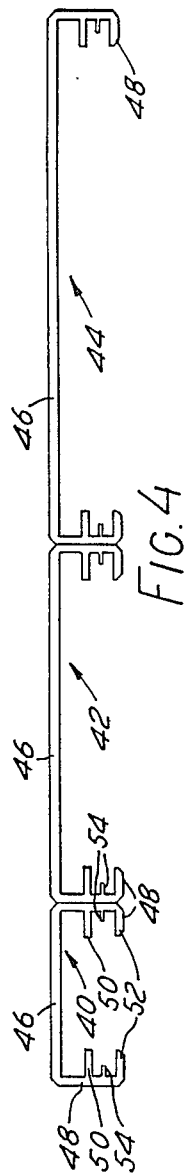

DISPLAY APPARATUS

This application is a continuation of application Ser. No. 691,961 filed Jan. 16, 1985.

BACKGROUND OF THE INVENTION

The present invention relates to display apparatus, and particularly to means for mounting signs to walls and ceilings or other surfaces.

SUMMARY OF THE INVENTION

According to the present invention in one aspect, there is provided a display apparatus comprising at least one elongate display member having means defining a longitudinal channel open at one end, and a support comprising a portion arranged to be mountable to a surface, and at least one projection means projecting therefrom and receivable within the channel of the display member to support it.

Preferably the support is selectively mountable in two configurations such that the projection means extends outwardly away from or substantially parallel to the surface.

Preferably the display member has a cavity or channel opening at each end. A display apparatus may then include two supports, mountable with their projection means mutually opposed and arranged to be received within the channel or the respective channels at the ends of a display member.

The or each support may be an elongate element having a multiplicity of projection means along its length, whereby a multiplicity of display members are supportable. Preferably the projection means are so spaced that display members are mountable with adjacent display members substantially in contact so as to present a substantially flush composite surface. An elongate element may be arranged to be separable into desired lengths containing any number of projection means. Display members may be of different sizes, having channels receiving one or a plurality of adjacent projection means.

A display member may have means defining two like parallel channels, each extending over its whole length and open at both ends, so that either can receive a projection means. Preferably at least one of the channels is open along at least part of its length, so that a slat may be slidably received in it with a portion of a surface of the slat visible through the opening. Depending on which channel receives the projection means, this open channel may face in either direction. A channel may have means defining elongate ribs projecting into it, so as to define two substantially parallel narrower channels, one behind the other. This is particularly useful for a forwardly open channel. For example, the rear one of the narrower channels may contain a slat bearing alternative information such as "IN" and "OUT", and the front narrower channel may contain a short slat which is displaceable so as to obscure selectively one of these. The projection means may have grooves for receiving the elongate ribs defining the narrower channels. This may increase the positiveness of the support.

BRIEF DESCRIPTION OF THE DRAWINGS

FIG. 1 is a plan view of a support;

FIG. 2 is a side elevation viewed in the direction of arrow II in FIG. 1;

FIG. 3 is a front elevation of the support;

FIG. 4 is a front elevation of three display members of different sizes.

DESCRIPTION OF THE PREFERRED EMBODIMENT

Figure 5:
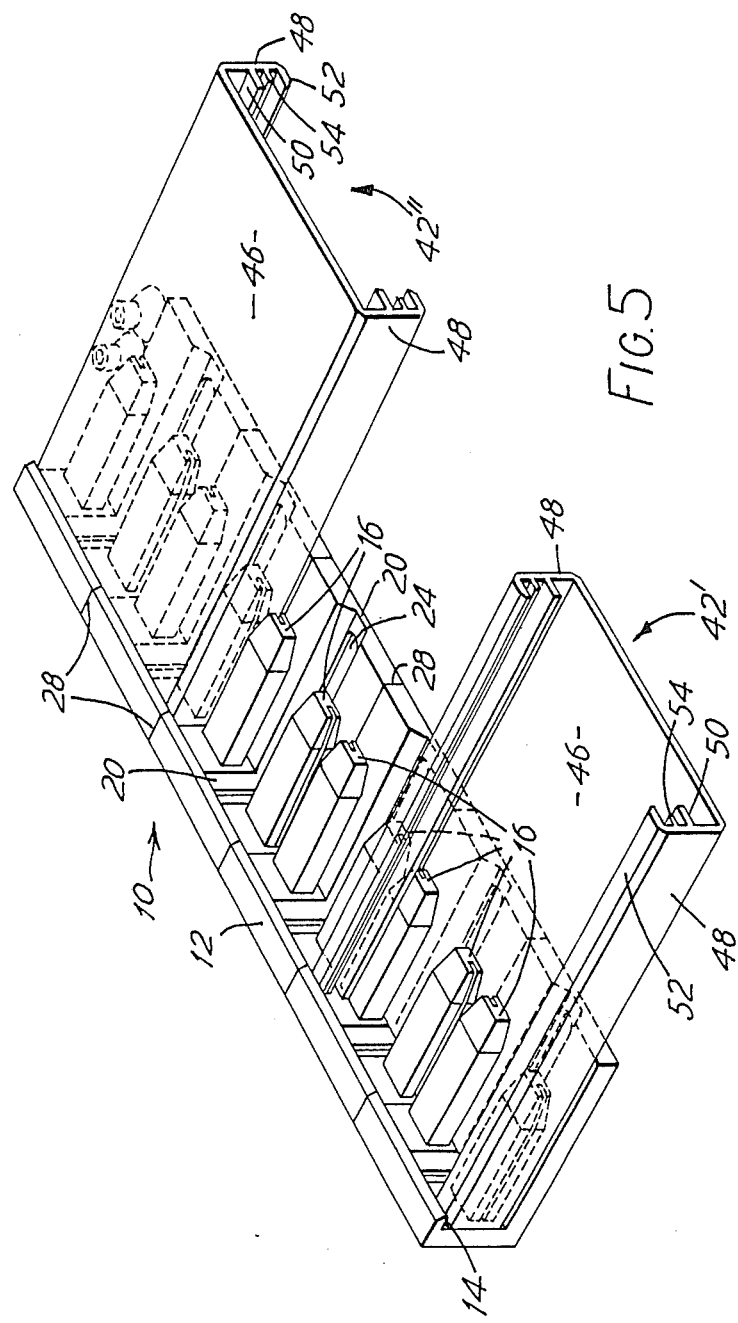
FIG. 5 is a perspective view of a support and two display members in alternative orientations.

The support 10 comprises a generally L-shaped elongate bracket 12. The shorter leg of the L has, at its free end, an upstanding flange 14 projecting in the same sense as the other leg. At an intermediate region of the shorter leg, close to the longer one, there are a multiplicity of tongues 16 projecting generally parallel to the longer leg. The tongues 16 are arranged in a row, with alternately large and small spacings between them. For most of the length of a tongue 16, its cross-section is generally rectangular (possibly with bevelled edges), and with a slot 17 in that face which faces the nearer adjacent tongue 16. A free end portion 18 narrows to facilitate insertion of the tongue into a channel, as will be described later.

Between adjacent tongues 16 with the larger spacing, there are respective L-shaped channels 20 in the bracket 12. That is, the thickness of the bracket 12 is reduced. The channels 20 have bevelled edges 22. The bottom of the channels 20 in the longer legs of the bracket 12 are penetrated by elongate apertures 24 which run parallel to the tongues 16. There could also be corresponding apertures in the short legs of the bracket 12, but for the sake of appearances we prefer to have instead panels 26 which can be knocked out if required.

The support 10 is provided with regularly-spaced transverse lines of weakness 28. These extend between adjacent closely-spaced tongues 16. Preferably, the lines extend on the inside face of the flange 14 (facing towards the tongues 16), so that it is not generally visible.

It is preferred to form the support from plastics material, and preferably the main forming step is performed by injection moulding. It is convenient simultaneously to form a pair of spacer members 30, whose function will be described later. Thus, the moulding can give a support 10 with the spacers 30 attached by slender nibs 32, so that they can be easily detached on site.

FIG. 4 shows three elongate display members 40, 42, 44. Each is an extrusion of constant section, having a base 46 and a pair of opposed arm pieces 48. Each arm piece 48 has an inwardly projecting flange 50 extending parallel to the base 46 from the middle of the piece 48. The outer end of each piece 48 has an inwardly pointing bevelled flange 52, which is of similar extent to the intermediate flange 50. Between these two large flanges 50, 52, there is a thinner and shorter flange 54.

Each display member is dimensioned so that it can embrace a pair of tongues 16 of a bracket 12. The different display members 40, 42, 44 differ in the width of their bases 46. The smallest member 40 is dimensioned so as to embrace an adjacent pair of widely-spaced tongues 16. The next largest member 42 (also shown in FIG. 5) is of twice the size, and the largest 44 is of three times the size. (Of course, still larger display members could be used.) In each case, the arm pieces 48 extend beyond closely-spaced tongues 16. It can be seen that the dimensions are such that when there are a pair of display members 48 occupying adjacent sites, their adjacent arm pieces 48 are in contact.

As shown in FIG. 5, a display member can be fitted to the support 10 so that tongues 16 thereof engage either between the intermediate flange 50 and the base 46 (as with the member 42' at the left in FIG. 5), or between the two flanges 50,52 (as with the member 42 at the right in FIG. 5). This will affect whether it is the base 46 or the outer flange 52 which lies against the long leg of the L-bracket 12. When the tongues 16 are engaged between the flanges 50,52, then the small flanges 54 engage in the slots 17 on respective tongues 16.

The illustrated apparatus may be used to mount a sign flat against a wall or other surface, or so as to project. For mounting flat against a surface, the support is fixed to the walls by screws or bolts passing through the apertures 24 (whose bevelled edges 22 provide countersinking). Generally, a pair of supports 10 will be used, one to support each end of the display members. They will then be mounted the appropriate distance apart, with their tongues 19 mutually opposed. For at least one of the supports 10, the screws will not be driven home so tightly as to prevent all relative motion. Thus one or both supports 10 can be slid outwardly to allow a display member to be engaged over tongues 16 of one support 10. Relative displacement of the supports 10 towards one another then drives the tongues 16 of the other support into the display members, which are thus securely and firmly held.

To provide a projecting sign, a support is mounted by screws or other such means driven through the panels 26, or through apertures provided by knocking out these panels. A display member can then be simply pushed over outwardly projecting tongues 16.

In either configuration, the display members can be mounted in two different orientations. It is normally desired to use the channel defined by the flanges 50 and 52 for mounting matter to be displayed, so of course one would not normally choose an arrangement in which this was pointing into the wall. Generally, information to be displayed will be provided on slats which can be inserted slidably into the channels defined by the flanges 50 and 52. Thin slats may be used which can be inserted into the narrower channels formed on either side of the small flanges 54. A slat bearing information could be mounted in the channel defined by flanges 50 and 54, whereas the front channel contained a transparent protector sheet. Alternatively, the front channel may contain a short opaque slat which is slidable so as selectively to obscure parts of the material written on the slat behind.

A pair of supports 10 may be mounted back-to-back, with corresponding legs of their L-brackets 12 abutting. They may be clamped together by means of the spacers 30 passed through the apertures 24 (or apertures produced in the panels 26).

The illustrated support has twelve tongues 16, though of course they can be produced with any number. If a small support 10 is required, e.g. to mount a single small display member 40, this is readily obtained by breaking off the required piece along a line of weakening 28.

In use, when a support 10 is used for supporting display members extending parallel to a wall, the only part of the support 10 which is visible from the front is the flange 14. This has a pleasing, unbroken appearance, since even any remaining lines of weakness 28 do not appear on this face. Of course, if the rear face of the shorter leg of the L-bracket 12 is visible, lines 28 are visible thereon. However, these are not very unsightly, and are in any case invisible if pairs of supports 10 are mounted back-to-back.

The display members preferably comprise aluminum extrusions.

While the invention has been illustrated by reference to a preferred embodiment it will be understood by those skilled in the art that various changes may be made without departing from the spirit and scope of the invention, and it is intended to cover all such changes by the appended claims.

We claim:

1. Display apparatus comprising at least one elongate display member which is adapted to bear indicia for display, and at least one support for the display member; said display member being an elongate extrusion of C-section, defining a channel open at each end, the extrusion having wall portions at each side defining between them a longitudinal narrowed mouth of the channel, and an opposed base wall portion; the extrusion also having an opposed pair of internal ribs that extend parallel to said base wall portion and divide the channel interior into two longitudinally extending cavities, each of which has an open axial end mouth at each end of the display member; a first one of said cavities communicating with the longitudinal narrowed mouth, and the second said cavity being bounded by said base wall portion; said support comprising a mounting portion having first and second arm portions disposed in an L-configuration and being arranged to be mountable to a surface, and at least one display member supporting means projecting away from said first arm portion in the same direction as the second arm portion and spaced therefrom; said display member supporting means and each of said first and second cavities being mutually dimensioned so that said supporting means is insertable selectively into either cavity through either axial end mouth thereof to provide support for the display member, the supporting means projecting from said first arm portion in the longitudinal direction of the display member; the spacing of the supporting means from the second arm portion being such that the display member is supportable by the supporting means selectively in either one of first and second configurations, said first configuration being one in which said base wall portion is substantially in contact with the second arm portion and the supporting means is inserted in the cavity bonded by said base wall portion; and said second configuration being one in which the second arm portion is substantially in contact with the longitudinal narrowed mouth defining wall portions, and the supporting means is inserted in the cavity which communicates with said longitudinal narrowed mouth.

2. Display apparatus according to claim 1 wherein the support is selectively mountable in two configurations such that the display member supporting means extends outwardly away from or substantially parallel to the upright wall surface.

3. Display apparatus according to claim 1 including two said supports whereby the display member is supported at both ends simultaneously.

4. Display apparatus according to claim 1 wherein the support is an elongate element having a multiplicity of display member supporting means along its length, whereby a multiplicity of display members are supportable.

5. Display apparatus according to claim 4 wherein the display member supporting means are so spaced that display members are mountable with adjacent display members substantially in contact so as to present a substantially flush composite surface.

6. Display apparatus according to claim 4 wherein the elongate element is arranged to be separable into desired lengths having desired numbers of display member supporting means.

7. Display apparatus according to claim 4 including a plurality of display members having respective cavities of different sizes for simultaneously receiving respective different numbers of display member supporting means.

8. Display apparatus according to claim 1 further including a slat slidably receivable in said first channel with a portion of a surface of the slat visible through the longitudinal narrowed mouth.

9. Display apparatus according to claim 1 wherein said display member supporting means comprises a pair of tongues projecting in parallel from the first arm portion of the support, and wherein the mounting portion between the tongues is adapted to receive fixing elements for mounting the supporting to a surface.

10. Display apparatus according to claim 1 wherein at least one said cavity of the display member has a further opposed pair of longitudinal ribs projecting into it, and said display member supporting means has a pair of grooves for receiving said further ribs.

11. Display apparatus comprising a plurality of elongate display members and at least one support, the support being elongate and having two arm portions defining an L-section; the support being adapted to be mounted to a surface selectively with either arm portion flush therewith; the support having a multiplicity of tongues projecting in a longitudinal row from a first said arm portion parallel with a second said arm portion, said tongues having alternate large and small spacings; both arm portions being adapted in the longitudinal regions of the large spacings to receive fixing members for mounting the support to a surface; each display member being elongate and defining a narrow-mouthed and open ended channel, each display member having a base and two opposed side walls projecting therefrom; there being distal opposed in-turned flanges at the distal ends of the side walls to provide said narrowing, and inner opposed in-turned flanges at intermediate regions of the side walls to divide the channel into first and second parallel cavities, each being open at each axial end; each display member being dimensioned to be pushable endwise onto the support with at least two tongues projecting selectively into either the first or the second cavity to support the member, with the side walls extending between adjacent tongues of small spacing, which spacing is adapted to the dimensions of the display members so that two members can be mounted side by side on adjacent groups of tongues, the spacing of the tongues from the second arm portion being such that, in a first configuration of said display member, tongues are received in the cavity which is adjacent the base, and the second arm portion is adjacent the base, and, in a second configuration of said display member, the tongues are received in the cavity which is adjacent the distal ends of the side walls, and the second arm portion is adjacent the distal flanges; said display member being rotated through 180° about its longitudinal axis between said configurations.

* * * * *